(12) United States Patent
Ho et al.

(10) Patent No.: US 9,387,430 B2
(45) Date of Patent: Jul. 12, 2016

(54) METHODS AND SYSTEMS OF ENHANCED CARBON DIOXIDE RECOVERY

(71) Applicant: Apache Corporation, Houston, TX (US)

(72) Inventors: Jason G. S. Ho, Houston, TX (US); J. Calvin Cooper, Houston, TX (US)

(73) Assignee: Apache Corporation, Houston, TX (US)

( * ) Notice: Subject to any disclaimer, the term of this patent is extended or adjusted under 35 U.S.C. 154(b) by 0 days.

(21) Appl. No.: 14/852,150

(22) Filed: Sep. 11, 2015

(65) Prior Publication Data

US 2016/0001219 A1    Jan. 7, 2016

Related U.S. Application Data

(60) Provisional application No. 62/081,609, filed on Nov. 19, 2014, provisional application No. 62/162,924, filed on May 18, 2015.

(51) Int. Cl.
| | | |
|---|---|---|
| *B01D 53/047* | (2006.01) | |
| *B01D 53/22* | (2006.01) | |
| *C01B 31/20* | (2006.01) | |

(52) U.S. Cl.
CPC .............. *B01D 53/047* (2013.01); *B01D 53/22* (2013.01); *B01D 53/225* (2013.01);
(Continued)

(58) Field of Classification Search
CPC .... B01D 53/047; B01D 53/22; B01D 53/225; B01D 53/229; B01D 2053/221; B01D 2256/22; B01D 2257/304; B01D 2257/504; B01D 2259/414; C01B 31/20
USPC .......................... 95/51, 136, 139; 96/131, 132
See application file for complete search history.

(56) References Cited

U.S. PATENT DOCUMENTS

| | | |
|---|---|---|
| 4,171,206 A | 10/1979 | Sircar |
| 4,229,188 A | 10/1980 | Intille |

(Continued)

FOREIGN PATENT DOCUMENTS

| | | |
|---|---|---|
| JP | H06327936 A | 11/1994 |
| WO | 2012153808 A1 | 11/2012 |
| WO | 2014005745 A1 | 1/2014 |

OTHER PUBLICATIONS

N. Ani, Dissertation, "Structural Evaluation of Zeolite Imidazolate Framework 8 (ZIF-8) Nanoparticles as Adsorbent for Carbon Dioxide Removal," May 2013.

(Continued)

*Primary Examiner* — Jason M Greene
(74) *Attorney, Agent, or Firm* — Bracewell LLP; Constance G. Rhebergen; Kevin R. Tamm (57) ABSTRACT

Methods and systems of enhanced carbon dioxide recovery from an inlet gas stream are provided, by introducing the gas stream to one or more membrane-based separation units to produce a permeate byproduct gas stream having increased concentration of carbon dioxide compared to the inlet gas stream and then introducing the permeate byproduct gas stream to one or more pressure swing adsorption units or trains to enhance recovery of hydrocarbons, such as methane, lost in the byproduct stream and to produce a substantially pure carbon dioxide stream, while minimizing process compression and eliminating process heat for process regeneration. The methods introduced herein are for enhancing product recovery by enhancing carbon dioxide recovery from gas streams with pressures greater than atmospheric conditions. Further refinement to the methods would be the introduction of hydrogen sulfide polishing units within the process to produce product that meets or exceeds sales quality specifications.

21 Claims, 6 Drawing Sheets

(52) U.S. Cl.
CPC .............. *B01D 53/229* (2013.01); *C01B 31/20* (2013.01); *B01D 2053/221* (2013.01); *B01D 2256/22* (2013.01); *B01D 2257/304* (2013.01)

(56) References Cited

U.S. PATENT DOCUMENTS

| | | | |
|---|---|---|---|
| 4,238,204 A | 12/1980 | Perry | |
| 4,645,516 A | 2/1987 | Doshi | |
| 4,690,695 A | 9/1987 | Doshi | |
| 4,701,187 A | 10/1987 | Choe | |
| 4,726,815 A | 2/1988 | Hashimoto | |
| 4,783,203 A | 11/1988 | Doshi | |
| 4,836,833 A | 6/1989 | Nicholas | |
| 4,863,492 A | 9/1989 | Doshi | |
| 5,112,590 A | 5/1992 | Krishnamurthy | |
| 5,332,424 A | 7/1994 | Rao | |
| 5,401,300 A * | 3/1995 | Lokhandwala | B01D 53/22 95/51 |
| 5,411,721 A * | 5/1995 | Doshi | B01D 53/229 95/51 |
| 5,435,836 A | 7/1995 | Anand | |
| 5,632,803 A | 5/1997 | Stoner | |
| 5,679,133 A | 10/1997 | Moll | |
| 5,753,010 A | 5/1998 | Sircar | |
| 5,753,011 A | 5/1998 | Sircar | |
| 5,837,032 A | 11/1998 | Moll | |
| 6,128,919 A | 10/2000 | Daus | |
| 6,179,900 B1 * | 1/2001 | Behling | B01D 53/229 95/102 |
| 6,245,127 B1 | 6/2001 | Kane | |
| 6,551,380 B1 | 4/2003 | Reddy | |
| 6,589,303 B1 | 7/2003 | Lokhandwala | |
| 6,610,124 B1 | 8/2003 | Dolan | |
| 6,893,483 B2 | 5/2005 | Golden | |
| 7,314,503 B2 | 1/2008 | Landrum | |
| 7,575,624 B2 | 8/2009 | Cartwright | |
| 7,637,984 B2 | 12/2009 | Adamopoulos | |
| 7,815,713 B2 | 10/2010 | Sorensen | |
| 7,938,893 B2 | 5/2011 | Doong | |
| 8,012,446 B1 | 9/2011 | Wright | |
| 8,088,196 B2 | 1/2012 | White | |
| 8,137,435 B2 | 3/2012 | Chen | |
| 8,221,524 B2 | 7/2012 | Mitariten | |
| 8,268,044 B2 | 9/2012 | Wright | |
| 8,303,930 B2 | 11/2012 | Chen | |
| 8,394,174 B2 | 3/2013 | Chen | |
| 8,460,630 B2 | 6/2013 | Niitsuma | |
| 8,480,789 B2 | 7/2013 | Sorensen | |
| 8,495,882 B2 | 7/2013 | Ku | |
| 8,535,638 B2 | 9/2013 | Terrien | |
| 8,551,226 B2 | 10/2013 | Lee | |
| 8,585,802 B2 | 11/2013 | Keller | |
| 8,894,753 B2 * | 11/2014 | Park | B01D 53/62 95/139 |
| 2006/0260189 A1 | 11/2006 | Reddy | |
| 2007/0282021 A1 | 12/2007 | Campbell | |
| 2009/0117024 A1 | 5/2009 | Weedon | |
| 2010/0260657 A1 | 10/2010 | Niitsuma | |
| 2010/0275777 A1 | 11/2010 | Hasse | |
| 2010/0287981 A1 * | 11/2010 | Chen | C01B 3/384 62/619 |
| 2011/0185896 A1 * | 8/2011 | Sethna | B01D 53/229 95/45 |
| 2011/0247360 A1 | 10/2011 | Hasse | |
| 2011/0268618 A1 | 11/2011 | Finkenrath | |
| 2011/0290111 A1 * | 12/2011 | Dunne | B01D 53/229 95/51 |
| 2012/0039794 A1 | 2/2012 | Catchpole | |
| 2012/0048111 A1 | 3/2012 | Nakao | |
| 2012/0118011 A1 | 5/2012 | Terrien | |
| 2012/0121497 A1 | 5/2012 | Terrien | |
| 2012/0291481 A1 | 11/2012 | Terrien | |
| 2012/0291484 A1 | 11/2012 | Terrien | |
| 2012/0292574 A1 | 11/2012 | Terrien | |
| 2012/0326091 A1 | 12/2012 | Iaquaniello | |
| 2013/0011326 A1 | 1/2013 | Grover | |
| 2013/0017146 A1 | 1/2013 | Darde | |
| 2013/0200625 A1 | 8/2013 | Wei | |
| 2014/0144321 A1 | 5/2014 | Sawamura | |
| 2015/0298972 A1 * | 10/2015 | Ballaguet | B01D 53/226 423/575 |

OTHER PUBLICATIONS

S. Meth, "Silica Nanoparticles as Supports for Regenerable CO2 Sorbents," ACS Publications, Energy & Fuels, Apr. 11, 2012.

* cited by examiner

(Prior Art)

FIG. 8B

(Prior Art)

FIG. 9

METHODS AND SYSTEMS OF ENHANCED CARBON DIOXIDE RECOVERY

RELATED APPLICATIONS

This application is a non-provisional application and claims priority to U.S. provisional application Nos. 62/081,609 and 62/162,924 filed on Nov. 19, 2014 and May 18, 2015, respectively, the full disclosures of which are both hereby incorporated herein by reference in their entireties.

BACKGROUND

1. Field

Embodiments of the present invention relate generally to the field of separation of carbon dioxide from a gas stream.

2. Description of Related Art

Carbon dioxide is present in produced natural gas streams and gas streams from oil and gas reserves, especially in gas streams from enhanced oil recovery processes. Carbon dioxide is produced as part of several industrial processes, including but not limited to, hydrocarbon processing plants, other oil, gas, and coal processing plants, and other chemical production plants. Carbon dioxide management can be an essential strategy for these processing and production facilities to achieve environmental compliance and also to optimize production from the facility. Traditional carbon dioxide treatment and separation processes include one of several technologies, including absorption, adsorption, cryogenic separation, membrane separation, bio-fixation and other separation systems. While separation processes have their merits, many have inherent disadvantages.

A common technology used for acid gas removal in natural gas processing is aqueous amine systems. Amine systems can be large and complicated processes that are highly energy inefficient due to high energy requirements for regeneration. For example, temperatures in the range of about 120° C. to about 140° C. are required. Furthermore, aqueous amines are prone to foaming and are corrosive in nature; often components and piping require stainless steel for construction. Aqueous amines also form non-regenerative, degradative compounds in the system that need to be periodically removed. Moreover, with adsorber columns, regenerative columns, flash tanks, reboilers, and water treatment systems, amine systems have a large equipment footprint and are typically not modular in design, making these acid gas removal systems costly and unsuitable for many gas capture applications, such as offshore use.

Figure 1:
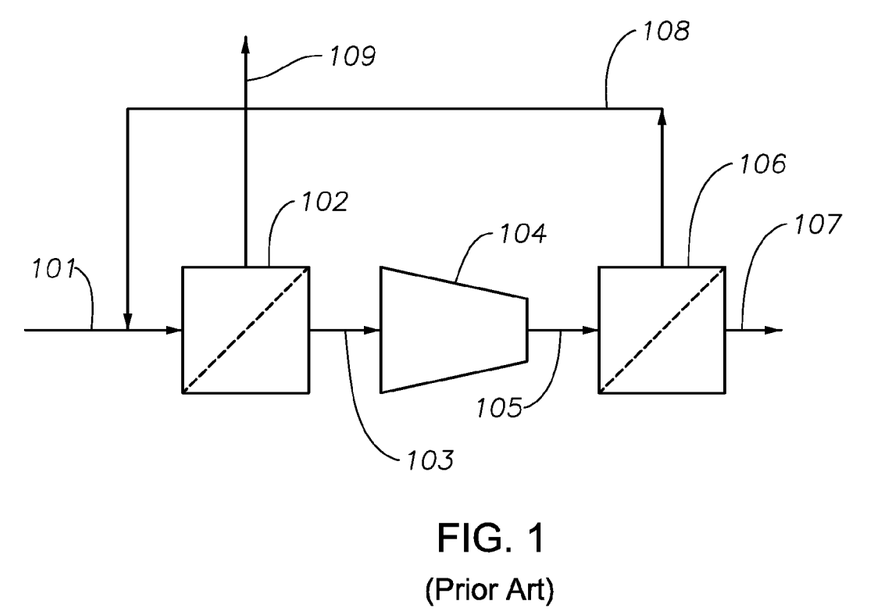
FIG. 1 is a schematic block diagram of a carbon dioxide treatment unit existing in the prior art.

A simpler separation process, such as membrane separation, does not require an immersion into an aqueous phase, and can process large volumes in a relatively small footprint, especially when compared to more conventional systems employing amine technology. The modularity and lack of mechanical complexity also allow for easy scale-up and flexibility. FIG. 1 illustrates membrane-based separation units that are usually employed for carbon dioxide separation from an exemplary inlet gas stream. Exemplary inlet gas stream 101 is introduced to a first membrane-based separation unit 102. The retentate gas stream 109 is supplied as sales gas. The permeate byproduct gas stream 103 from this first membrane-based separation unit 102 is optionally supplied to a compressor 104 and further introduced by stream 105 to a second membrane-based separation unit 106 for increased product recovery. The permeate 107 from the second membrane-based separation unit 106 is usually a low British Thermal Unit (BTU) flare gas and still has a considerable amount of carbon dioxide. Typically, about 10-20% volume of the retentate gas 108 from the second membrane-based unit 106 is recycled back to the first membrane-based separation unit 102 to enhance product recovery.

A second membrane-based separation unit, or stage, is required because there is a trade-off between selectivity and permeability with membranes. Therefore in many instances, simple single-stage membrane systems may not be able to achieve the product purity required and/or product recovery is also decreased due to product slippage through the membrane. Therefore, energy intensive compression, a recycle stream and a second stage of membrane separation is required to reduce product loss. Additionally, to account for the extra recycle volume, either or both of the gas treatment capacity and surface area of the initial membrane has to be increased.

Another gas separation technique used in specialty gas production, such as oxygen, nitrogen, and hydrogen production, but traditionally not applied to natural gas separation, is pressure swing adsorption (PSA). PSA can achieve excellent purity by adsorbing the target component to be purified, but is usually not appropriate for natural gas separation processes because of the large volumes involved. PSA is an intrinsically clean technology when compared to amines, which are toxic, can be corrosive, and typically require significant heat input to be regenerated, but ultimately form a waste product. In addition, PSA produces a methane product that, unlike amine absorption, does not require a post-processing step for dehydration, and it does not depend on heat for regeneration. However, PSA units may not be the best option in streams with very low partial pressures of contaminant gas species. Moreover, because of its focused development for specialty gas production, there is relatively little focus on large scale systems and PSA development for natural gas purification.

Traditionally, a desired, higher-value end product, such as methane, is "captured" while contaminants, such as $CO_2$ and $H_2S$, are passed through the system. Existing product recovery systems do not contemplate using PSA for high volume natural gas processing, because there has not been an economical or functional way to use such a system. PSAs have traditionally been used for high-purity product processes where high recovery may be appreciated, but is not necessary; for example, hydrogen purification for refining using PSA (99.99+ % purity) or nitrogen purification from air for the electronics industry or hypoxic fire prevention systems by PSA (99.9% purity). In these examples, product purity is more critical than product recovery.

In prior systems, PSA units have been used to polish valuable product streams, such as, for example, a retentate stream containing products of value, such as natural gas. However, products of value are wasted because the waste streams of primary separations, such as the permeate byproduct stream of a membrane separation, still contain valuable product, and so too does the waste stream, or "tail gas," of the PSA used to polish the valuable product stream. Prior systems have not used PSA to enhance recovery of valuable product lost through the waste stream of a primary separation, such as, for example, a membrane. There is a need for systems and methods that can not only obtain substantially pure product streams such as natural gas, but also recover potential product lost during separation and delivery, including substantially pure byproduct streams such as $CO_2$ and $H_2S$.

SUMMARY

Applicants recognize the importance of removing carbon dioxide from gas streams produced from a variety of sources. Various embodiments of methods and apparatus for recovery of carbon dioxide are provided herein. Exemplary embodiments of the present invention also include integrated systems and methods of recovery of carbon dioxide, using a membrane-based separation unit and a pressure swing adsorption (PSA) unit, combined with the treatment of hydrogen sulfide. Exemplary embodiments of the present invention still also include systems and methods of recovery of carbon dioxide by use of a pressure swing adsorption unit in conjunction with a membrane-based separation unit during the process of managing environmental emissions. Exemplary embodiments of the present invention further include methods of treating hydrogen sulfide in an inlet gas stream before introducing the gas stream to a membrane-based separation unit for the recovery of carbon dioxide. Exemplary embodiments of the present invention still further include methods of treating hydrogen sulfide present in the retentate stream from a membrane-based separation unit to further enhance the purity of the retentate stream. By capturing waste products of a primary separation and purifying them to a high degree by way of PSA, in contravention to conventional practice, both purity and recovery can be increased for both a primary and secondary product, such as for example $CH_4$ and $CO_2$. In this manner, $CO_2$, which has traditionally been treated as a contaminant or byproduct, is transformed into a saleable product.

By using PSA as both a product purity and product recovery system, unexpectedly efficient and economic systems and methods are presented. With respect to natural gas processing, applicant has recognized that adsorbent materials that have small microporous structures improve selectivity to $CO_2$ adsorption while allowing $CH_4$ pass-through, and systems and methods of the present disclosure are highly efficient for $CO_2$ collectivity. In some embodiments, by combining an initial membrane and a PSA that selectively adsorbs $CO_2$, highly-concentrated product and contaminant streams are produced in a single-pass system.

The ability to take advantage of the two aforementioned gas separation techniques (PSA and membrane separation) and combine them to a form a flexible, modular, energy-efficient natural gas process with high product purity and recovery is achievable. A single stage membrane system can be designed to accept a large volume of natural gas that is at a high-pressure and has low purity. Operating at a pressure differential effective for the bulk removal of contaminant species, such as $CO_2$ and $H_2S$, into a permeate byproduct gas stream creates a primary methane-rich retentate/product stream, that could be close to or at pipeline quality specifications. The permeate byproduct gas stream at a lower pressure and lower volume, which has the concentrated contaminant gases, can be re-compressed and fed into a second stage membrane for improved methane/product recovery. However, in exemplary embodiments of the present invention, this permeate byproduct gas stream is instead fed into a PSA system designed to concentrate the contaminants, such as $CO_2$. The PSA allows for the recovery of an enriched $CO_2$ stream (heavy product) and a high purity methane stream (light product) from the permeate byproduct gas stream of the membrane with much less compression than a second stage membrane would require. The need for additional processes to remove water from the product natural gas, typical of amine technology, is not required.

Prior systems and methods for purified $CH_4$ recovery have not provided for the joint use of a membrane and PSA to achieve multiple, highly-concentrated product streams. Prior PSA systems have been used as product polishing steps to further enhance purity of a particular component, at the expense of lowered recovery. The use of a PSA step to enhance product recovery while maintaining purity has not been contemplated until the present disclosure. At the front end of a gas processing plant, high pressures at about 1,000 psi to about 1,400 psi are seen in natural gas inlet streams. PSA units are not used at high volumes or high capacities in the natural gas industry, and are not used at high pressures.

Surprisingly, however, the systems and methods of the present disclosure have produced an efficient and economic means of natural gas processing and contaminant removal. Moreover, the adsorbent of the PSA in the present disclosure does not require added heat to regenerate the adsorbent, which is significantly advantageous and different from currently existing systems. As noted above, $CO_2$ separation on an industrial scale is normally performed with amines, which require thermal regeneration. Membranes used for bulk separation have large hydrocarbon slip or pass-through. However, the use of PSA herein allows for the efficient capture of contaminant, $CO_2$ and $H_2S$, and the efficient pass-through of $CH_4$, the methane product.

Therefore disclosed herein is a method of enhanced carbon dioxide recovery from an inlet gas stream. The method includes the steps of introducing the inlet gas stream, having carbon dioxide and hydrogen sulfide, to one or more hydrogen sulfide polishing units and operating the one or more hydrogen sulfide polishing units to produce an outlet gas stream with a reduced concentration of hydrogen sulfide compared to the inlet gas stream. The method further includes the steps of introducing the outlet gas stream to one or more membrane-based separation units, operating the one or more membrane-based separation units to produce a permeate byproduct gas stream having increased concentration of carbon dioxide compared to the carbon dioxide concentration in the outlet gas stream, introducing the permeate byproduct gas stream to one or more pressure swing adsorption units, and operating the one or more pressure swing adsorption units to produce a substantially pure carbon dioxide stream.

In some embodiments, the method further comprises the steps of operating the one or more membrane-based separation unit to produce a retentate gas stream having hydrogen sulfide; introducing the retentate gas stream to one or more post-membrane hydrogen sulfide polishing units; and operating the one or more post-membrane hydrogen sulfide polishing units to produce a reduced hydrogen sulfide outlet gas stream with a reduced concentration of hydrogen sulfide compared to the retentate gas stream. In some embodiments, the permeate byproduct gas stream comprises less than 70% by molar basis carbon dioxide. In other embodiments, the permeate byproduct gas stream comprises less than 50% by molar basis carbon dioxide.

Further disclosed is an enhanced carbon dioxide recovery system, and the system includes one or more hydrogen sulfide polishing units that is operable to receive the inlet gas stream having carbon dioxide and hydrogen sulfide and to produce an outlet gas stream with a reduced concentration of hydrogen sulfide compared to the inlet gas stream; one or more membrane-based separation units that fluidly couples to the one or more hydrogen sulfide polishing units that is operable to receive the outlet gas stream and to produce a permeate byproduct gas stream having increased concentration of carbon dioxide compared to the carbon dioxide concentration in the outlet gas stream; and one or more pressure swing adsorption units that fluidly couples to the one or more membrane-based separation units that is operable to receive the permeate byproduct gas stream and to produce a substantially pure carbon dioxide stream.

In some embodiments, the one or more membrane-based separation units further is operable to produce a retentate gas stream having hydrogen sulfide. In other embodiments, the permeate byproduct gas stream comprises less than 70% by molar basis carbon dioxide. Still in other embodiments, the permeate byproduct gas stream comprises less than 50% by molar basis carbon dioxide.

Further disclosed is an enhanced carbon dioxide and hydrogen sulfide recovery system. The system includes one or more membrane-based separation units positioned to receive an inlet gas containing one or more of carbon dioxide and hydrogen sulfide and operably process the inlet gas thereby to produce respective and separate retentate outputs and permeate outputs therefrom; one or more hydrogen sulfide polishing units positioned to process the inlet gas prior to supply to the one or more membrane-based separation units; one or more hydrogen sulfide polishing units operably positioned to process the retentate outputs from the one or more membrane-based separation units; a first pressure swing adsorption unit operably positioned to remove hydrogen sulfide and carbon dioxide from the permeate outputs of the one or more membrane-based separation units prior to subsequent processing; and a second pressure swing adsorption unit in fluid communication with the first pressure swing adsorption unit operably positioned to receive and separate heavy stream outputs from the first pressure swing adsorption unit to produce a purified $CO_2$ stream and a purified $H_2S$ as outputs therefrom responsive to preselected adsorption-desorption characteristics of these gas components to adsorbents.

In some embodiments, the first and second pressure swing adsorption units comprise two or more pressure swing adsorption trains to separately purify hydrogen sulfide and carbon dioxide from the permeate outputs of the one or more membrane-based separation units, the two or more pressure swing adsorption trains being operable in scheduled and synchronized manners.

In other embodiments, each of the two or more pressure swing adsorption trains includes one or more individual beds. In some embodiments, the two or more pressure swing adsorption trains produce a purified hydrocarbon stream to operably combine with sales gas and produce a highly purified carbon dioxide stream and a highly purified hydrogen sulfide stream responsive to preselected adsorption-desorption characteristics of these gas components to adsorbents. Still in other embodiments, the two or more pressure swing absorption trains further produce an output of a gas mixture for fuel or other purposes. In yet other embodiments, the permeate output comprises less than 70% by molar basis carbon dioxide. Still in other embodiments, the permeate output comprises less than 50% by molar basis carbon dioxide.

In some embodiments of the methods disclosed, the substantially pure carbon dioxide stream is at least 90% pure carbon dioxide by molar basis. In some embodiments of the systems disclosed, the substantially pure carbon dioxide stream is at least 90% pure carbon dioxide by molar basis. In some embodiments of the systems disclosed, the purified $CO_2$ stream is at least 90% pure carbon dioxide by molar basis.

In some embodiments of the methods disclosed, the substantially pure carbon dioxide stream is at least 96% pure carbon dioxide by molar basis. In some embodiments of the systems disclosed, the substantially pure carbon dioxide stream is at least 96% pure carbon dioxide by molar basis. In some embodiments of the systems disclosed, the purified $CO_2$ stream is at least 96% pure carbon dioxide by molar basis.

Exemplary embodiments of the invention include methods of enhanced carbon dioxide recovery from a gas stream. An exemplary method includes the steps of introducing the inlet gas stream, having carbon dioxide and hydrogen sulfide, to one or more hydrogen sulfide polishing units and operating the one or more hydrogen sulfide polishing units to produce an outlet gas stream with a reduced concentration of hydrogen sulfide compared to the inlet gas stream. Then the outlet gas stream is introduced to one or more membrane-based separation units, which is operated to produce a permeate byproduct gas stream having increased concentration of carbon dioxide compared to the carbon dioxide concentration in the outlet gas stream. The permeate byproduct gas stream is introduced to one or more pressure swing adsorption units, which is operated to produce a substantially pure carbon dioxide stream.

An exemplary system for enhanced carbon dioxide recovery includes one or more hydrogen sulfide polishing unit, one or more membrane-based separation unit, and one or more pressure swing adsorption unit. The hydrogen sulfide polishing unit is operable to receive an inlet gas stream having carbon dioxide and hydrogen sulfide and to produce an outlet gas stream with a reduced concentration of hydrogen sulfide compared to the inlet gas stream. The system also includes one or more membrane-based separation units that fluidly couples to the one or more hydrogen sulfide polishing unit. The membrane-based separation unit is operable to receive the outlet gas stream and to produce a permeate byproduct gas stream having increased concentration of carbon dioxide compared to the carbon dioxide concentration in the outlet gas stream. The system further includes one or more pressure swing adsorption units that fluidly couples to the one or more membrane-based separation unit. This pressure swing adsorption unit is operable to receive the permeate byproduct gas stream and to produce a substantially pure carbon dioxide stream.

An exemplary method of enhanced carbon dioxide recovery from a gas stream includes introducing a gas stream, having carbon dioxide and hydrogen sulfide, to one or more membrane-based separation unit. The one or more membrane-based separation unit is operated to produce a permeate byproduct gas stream having increased concentration of carbon dioxide compared to the gas stream and a retentate gas stream having hydrogen sulfide. The retentate gas stream is then introduced to one or more hydrogen sulfide polishing unit that is operated to produce an outlet gas stream with a reduced concentration of hydrogen sulfide compared to the retentate gas stream. The permeate byproduct gas stream from the membrane-based separation unit is introduced to one or more pressure swing adsorption unit. The pressure swing adsorption unit is operated to produce a substantially pure carbon dioxide stream.

An exemplary system for enhanced carbon dioxide recovery includes one or more hydrogen sulfide polishing unit, one or more membrane-based separation unit, and one or more pressure swing adsorption unit. The membrane-based separation unit is operable to receive a gas stream, having carbon dioxide and hydrogen sulfide, and to produce a permeate byproduct gas stream having increased concentration of carbon dioxide compared to the gas stream and a retentate gas stream having hydrogen sulfide. The hydrogen sulfide polishing unit that fluidly couples to the one or more membrane-based separation units is operable to receive the retentate gas stream having hydrogen sulfide and to produce an outlet gas stream with a reduced concentration of hydrogen sulfide compared to the retentate gas stream. The pressure swing adsorption unit that fluidly couples to the one or more membrane-based separation unit is operable to receive the permeate byproduct gas stream and to produce a substantially pure carbon dioxide stream.

An exemplary method of enhanced carbon dioxide recovery from a gas stream includes introducing a carbon dioxide containing gas stream to one or more membrane-based separation unit. The one or more membrane-based separation unit is operated to produce a permeate byproduct gas stream having increased concentration of carbon dioxide compared to the carbon dioxide containing gas stream. The permeate byproduct gas stream then is introduced to one or more pressure swing adsorption unit that is operated to produce a substantially pure carbon dioxide stream.

An exemplary system for enhanced carbon dioxide recovery includes one or more membrane-based separation units, and one or more pressure swing adsorption units. The membrane-based separation unit is operable to receive a gas stream, having carbon dioxide, and to produce a permeate byproduct gas stream having increased concentration of carbon dioxide compared to the gas stream. The pressure swing adsorption unit that fluidly couples to the one or more membrane-based separation units is operable to receive the permeate byproduct gas stream and to produce a substantially pure carbon dioxide stream.

Further still, another exemplary system to enhance carbon dioxide and hydrogen sulfide recovery can include one or more membrane-based separation units positioned to receive the inlet gas containing one or more of carbon dioxide and hydrogen sulfide and operably process the inlet gas thereby to produce respective and separate retentate outputs and permeate outputs therefrom. The system also can include one or more hydrogen sulfide polishing units positioned to process the inlet gas from the supply prior to the one or more membrane-based separation units and one or more hydrogen sulfide polishing units operably positioned to process the retentate outputs from the one or more membrane-based separation units. Additionally, the system can include a first pressure swing adsorption unit operably positioned to remove hydrogen sulfide and carbon dioxide from the permeate outputs of the one or more membrane-based separation units prior to subsequent processing and a second pressure swing adsorption unit in fluid communication with the first pressure swing adsorption unit operably positioned to receive and separate heavy stream outputs from the first pressure swing adsorption unit to produce a purified $CO_2$ stream and purified $H_2S$ as outputs therefrom responsive to preselected adsorption-desorption characteristics of these gas components to adsorbents.

Additional embodiments of systems and methods, for example, can include the first and second pressure swing adsorption trains being operably positioned to form two or more pressure swing adsorption trains (e.g., Train I and Train II) to separately purify hydrogen sulfide and carbon dioxide from the permeate outputs of the one or more membrane-based separation units. The two or more pressure swing adsorption trains can be operable in scheduled and synchronized manners to enhance performance characteristics as will be understood by those skilled in the art. Each of the two or more pressure swing adsorption trains includes one or more individual beds, and the two or more pressure swing absorption trains can produce a purified hydrocarbon stream to operably combine with sales gas and produce a highly purified carbon dioxide stream as an output and a highly purified hydrogen sulfide stream as an output responsive to preselected adsorption-desorption characteristics of these gas components to adsorbents. The two or more pressure swing absorption trains also can produce an output of a gas mixture for fuel or other purposes as will be understood by those skilled in the art.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follow, like parts are marked throughout the specification and drawings with the same reference numerals, respectively. The drawings are not necessarily to scale. Certain features of the disclosure may be shown exaggerated in scale or in somewhat schematic form and some details of conventional elements may not be shown in the interest of clarity and conciseness.

Where the specification or the claims provide a range of values, it is understood that the interval encompasses each intervening value between the upper limit and the lower limit as well as the upper limit and the lower limit. The invention encompasses and bounds smaller ranges of the interval subject to any specific exclusion provided. "Substantially free" means less than 1% by the indicated unit of measure. "Significant" means equal to or greater than 10% by the indicated unit of measure. "Detectable amount" means 0.01% by the indicated unit of measure. Substantially pure means equal to or greater than 90% pure for the indicated component.

Where the specification and claims reference a method comprising two or more defined steps, the defined steps can be carried out in any order or simultaneously except where the context excludes that possibility. The verb "couple" and its conjugated forms mean to complete any type of required junction, including electrical, mechanical or fluid, to form a singular object from two or more previously non-joined objects. If a first apparatus or unit couples to a second apparatus or unit, the connection can occur either directly or through a common connector. "Operable" and its various forms means fit for its proper functioning and able to be used for its intended use.

As used herein, a unit refers to the set of equipment, structures, processes, materials, and other components that perform a specific operation in a chemical processing plant. A chemical processing plant can have one or more units to process the raw materials and obtain the desired products. The various units are usually connected to one another directly or indirectly by a variety of means including but not limited to electrical, mechanical or fluid means, in a way that allows materials to be transported from one unit to the next when each operation is complete.

As used herein, an inlet gas stream or inlet gas refers to carbon dioxide containing gas streams that are supplied to a membrane-based separation unit and/or pressure swing adsorption unit and whose carbon dioxide content is significantly increased by such processes. An inlet gas stream can also contain hydrogen sulfide and be subjected to a sulfide treatment unit, also referred to as a hydrogen sulfide polishing unit. Inlet gas streams suitable for the methods described herein are carbon dioxide containing emissions that exit an industrial chemical process or a power generation unit. In certain embodiments, the inlet gas stream can be from produced natural gas streams and associated gas streams from oil production, especially in gas streams from enhanced oil recovery processes. For example and without any limitations, inlet gas streams can have a relatively high carbon dioxide concentration, ranging from about 10% to about 70%. In certain embodiments, inlet gas streams can have a carbon dioxide concentration of between about 15% and 60%. The present methods can also be applied to any process that requires reduction, separation, or purification of carbon dioxide content.

As used herein, a membrane-based separation unit refers to any unit utilizing a selectively permeable membrane for the separation, concentration, removal, and/or purification of one or more components present in the inlet gas stream. Driving forces that facilitate the transport of one or more components from the inlet gas stream through the selectively permeable membrane can be pressure, concentration, electrical potentials or combinations thereof across the membrane. In certain embodiments, a membrane-based separation unit can include one or more membrane-based separation units. In certain embodiments, the selectively permeable membrane is a polymeric membrane. In certain embodiments, the selectively permeable membrane is an organic polymeric membrane. For example without limitations, such selectively permeable membranes can be based on cellulose acetate, polyimides, polyamides, polysulfones, polycarbonates, and polyetherimide. In certain embodiments, the selectively permeable membrane is a carbon membrane. In certain embodiments, the selectively permeable membrane is an inorganic membrane, including but not limited to ceramic membranes, alumina based membranes, and other metal oxide membranes. In certain embodiments, the selectively permeable membrane is a mixed matrix membrane that has both organic and inorganic components.

The selectively permeable membranes can be arranged in a variety of configurations. In certain embodiments, the selectively permeable membranes can be in a flat-sheet configuration. In certain embodiments, the selectively permeable membranes can be flat-sheet membranes in plate and frame configurations. In certain embodiments, the selectively permeable membranes can be arranged to increase packing density, for example without limitations, in a hollow-fiber or a capillary configuration. In certain embodiments, the selectively permeable membranes can be in a spirally-wound configuration. In certain embodiments, the selectively permeable membranes can be multilayered. For example but without limitations, the selectively permeable membrane can comprise an active layer adjacent to a support layer. In certain embodiments, the selectively permeable membranes can be made of polymer meshes.

Membranes are commercially available from several manufacturers including but not limited to Honeywell UOP, Air Liquide, and Praxair. Membrane based separation units can function over a wide range of temperatures from about 5° C. to about 70° C. Specifically designed membranes can also operate in higher temperatures, from about 65° C. to over 95° C. For example, without limitations, in certain embodiments, the inlet gas stream to a membrane separation unit can have relative carbon dioxide concentration of 40-50% and its partial pressure of 240-400 psi. In certain other embodiments, the inlet gas stream to a membrane separation unit can have relative carbon dioxide concentration of 10-15% and at atmospheric pressure. The nature of the gas stream, the extent to which other gases are present, and the location of the membrane separation process in the overall process of the plant will also shape the choice of the membrane.

As used herein, a pressure swing adsorption ("PSA") unit refers to one or more adsorption beds, adsorbents, and any components required by a unit that is configured to selectively separate one or more components from a gas stream by adsorption, during which components from a gas stream are selectively adsorbed onto adsorbent, followed by regeneration or desorption during which the selectively adsorbed species are removed from the adsorbent by a change in the pressure. Thus, a PSA unit is cyclically operated for adsorption of components from a gas stream and adsorbent regeneration. In a multi-bed PSA unit assembly, one or more beds can be used for separation of components from a gas stream, while the remaining beds are in the regeneration mode. During the adsorption phase, the adsorbent under pressure selectively traps one or more components from the inlet gas stream, leaving a purified stream to exit the unit, and during the adsorbent regeneration or desorption phase, these trapped components are removed from the adsorbent by reducing its pressure in successive steps.

The adsorbent is then pressurized and made ready to execute the next cycle. In certain embodiments, the inlet gas stream containing carbon dioxide and hydrogen sulfide is first processed by a membrane-based separation unit. Subsequently, the PSA units can operate in parallel to process the permeate stream from the membrane separation unit to get a purified hydrocarbon or gas stream and a purified $CO_2$ stream. In certain embodiments, the purified hydrocarbon or gas stream can then be used as fuel or recombined with retentate from the membrane separation unit as additional sales gas. In certain embodiments, multiple adsorbent beds are configured to form a PSA unit assembly for continuous operation. In certain embodiments, multiple PSA units operating in parallel can increase the carbon dioxide concentration capacity of the integrated system. In certain embodiments, operating multiple PSA units in parallel will enable the system to handle greater than 20% of the inlet gas volume, and in certain embodiments, the system can be enabled to handle greater than 30% of inlet gas volume.

Figure 6:
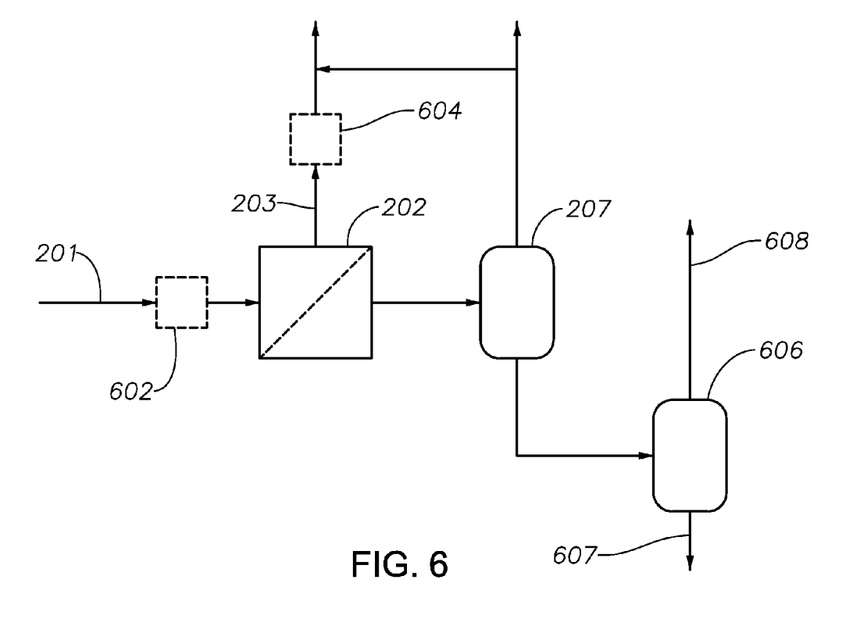
FIG. 6 is a schematic block diagram of another exemplary carbon dioxide treatment unit in combination with hydrogen sulfide polishing units and/or a subsequent hydrogen sulfide purification unit according to an embodiment of the present invention.

In certain embodiments, e.g., FIG. 6, the PSA units can function in series or in sequential order in which the hydrocarbon or gas stream is purified in the initial PSA unit and the heavy components, such as $H_2S$ and $CO_2$ are purified and separated in a subsequent PSA unit. The exploitation of differential adsorptive characteristics of adsorbents with individual components in a gas mixture can produce multiple streams of purified gas, be it hydrocarbon, $H_2S$, $CO_2$ and/or other gas species of interest found within an inlet gas mixture. This also allows the hydrocarbons that slip through in the permeate byproduct stream to be recovered thereby increasing value. Advantageously, separating hydrocarbons and capturing carbon dioxide avoids venting hydrocarbons with carbon dioxide to the atmosphere, thereby creating an environmental benefit. As noted, in addition to methane and carbon dioxide, hydrogen sulfide is often present in the inlet gas stream. Hydrogen sulfide can be polished to reduce the amount of hydrogen sulfide present as a contaminant in the retentate gas stream 203 through the use of hydrogen sulfide polishing unit 602, which polishes inlet gas stream 201.

Alternately, hydrogen sulfide can be polished in hydrogen sulfide polishing unit 604, which polishes retentate gas stream 203. This polishing is effective to reduce the amount of hydrogen sulfide present in the sales gas that results from the overall process to meet regulatory standards, for example, by reducing hydrogen sulfide to a specific level, such as, below about 16 ppm in the sales gas or in another embodiment, below about 4 ppm in the sales gas. The majority of the hydrogen sulfide does not enter retentate gas stream 203 but instead is carried through in the permeate byproduct gas stream. FIG. 6 demonstrates an example of separating the permeate byproduct gas stream into three product streams, including one which separates hydrogen sulfide. In this manner, hydrogen sulfide is captured through the PSA unit and avoids the costs associated with pre-treatment of the substantial majority of hydrogen sulfide or pre-treatment of the entire inlet gas stream through the use of amine capture or other traditional hydrogen sulfide processes that are capital and energy intensive, for example, based on the reliance for regeneration. The hydrogen sulfide can be captured for other uses, such as conversion to other products, or destroyed, such as through incineration. The carbon dioxide stream is recovered for value, instead of being vented to the atmosphere, thereby providing a clean system by avoidance of carbon dioxide emissions.

FIG. 6 demonstrates an embodiment with multiple products captured through the PSA unit, including carbon dioxide and hydrogen sulfide. This example also demonstrates separation of carbon dioxide from hydrogen sulfide to create a substantially purified carbon dioxide stream as a finished product as well as a hydrogen sulfide stream. Hydrogen sulfide gas is very poisonous, corrosive, and explosive. By separating and capturing contaminants as shown in FIG. 6, emissions to the atmosphere are substantially or totally reduced while simultaneously achieving significant cost benefits based on capital costs and energy input.

Figure 7:
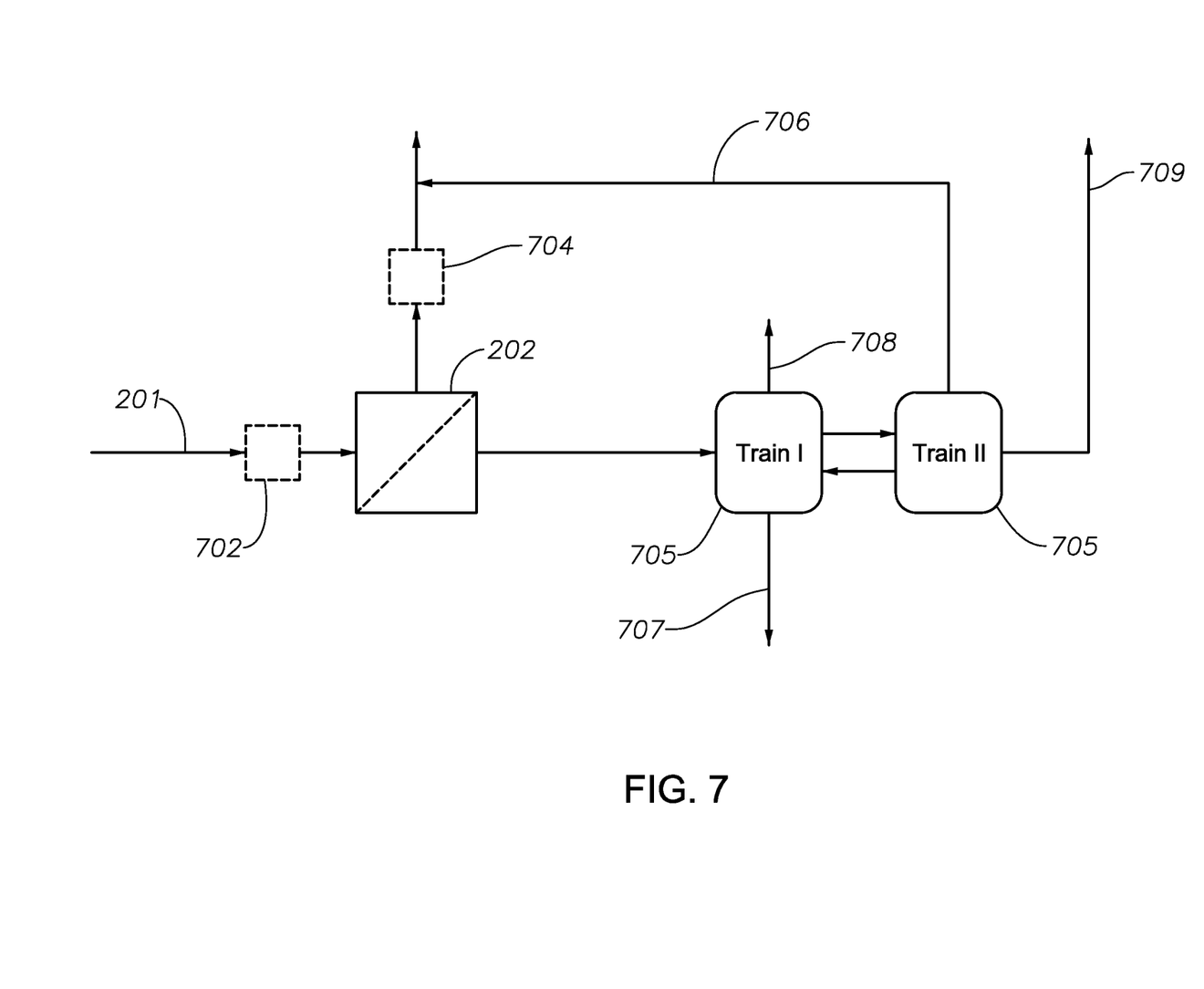
FIG. 7 is a schematic block diagram of another exemplary carbon dioxide treatment unit in combination with hydrogen sulfide polishing units and where the acid gases are further separated by synchronized and coupled trains into purified carbon dioxide and hydrogen sulfide according to an embodiment of the present invention.

In other embodiments, for example, e.g., FIG. 7, the PSA unit can include multiple trains of beds. In this instance shown in FIG. 7, the unit comprises groups of beds of different adsorbents where each group constituting a train in the system and a train consists of one or more beds. The trains interact with each other in a scheduled and coordinated manner so as to produce more than one pure product and can also produce one or more mixed stream products with defined compositions, all from an inlet gas mixture.

In certain embodiments, the adsorbent is selected from a group comprising zeolites, activated carbon, silica gel, and alumina. In some embodiments, activated, porous carbon particles derived from low-cost carbon sources are used in the adsorbent. Highly-microporous carbon particles advantageously have a much higher surface area than typical activated carbon. In another embodiment, the adsorbent can be carbon-based molecular sieves. In another embodiment, the adsorbent can be metal-oxide based molecular sieves or metal organic frameworks. In certain embodiments, the adsorbent can be made of nanoparticles. The adsorbent material can be presented in a variety of physical forms, including but not limited to powders, beads, pellets, granules, rods, and coatings on sheets. The adsorbent material should have a large working capacity between that observed for $CO_2$ and that observed for hydrocarbons, such as methane, especially in a system operating between 1 atm to 70 atm (about 14.7 psia to about 1,028.7 psia).

Typical inlet pressure of a natural gas stream, or "plant pressure," can be about 70 atm to 80 atm. Thus, in certain embodiments, inlet gas stream 201 can be about 70 atm to 80 atm. The pressure swing adsorption unit 207 can receive the permeate byproduct gas stream at pressures up to about 70 to about 80 atm. In certain embodiments, the permeate byproduct gas stream entering the pressure swing adsorption unit 207 can be in the range of about 1 atm to about 80 atm. Pressure swing during the operation of pressure swing adsorption unit 207 can be large, depending upon the adsorbent material and the pressure of the entering permeate byproduct gas stream, with pressures swinging down to between 0.1 atm up to about 70 atm during the regeneration process.

The adsorbent can be regenerated by reducing the pressure in the PSA to a regeneration pressure that is lower than a "plant pressure" or inlet pressure such that the adsorbent releases the adsorbed byproducts, such as $CO_2$ or $H_2S$. In some embodiments, the regeneration pressure is between about 0.1 atm and about 60 atm. In some embodiments, the regeneration pressure is between about 10 atm and about 50 atm. In some embodiments, the regeneration pressure is between about 1 atm and about 40 atm. In some embodiments, the regeneration pressure is between about 10 atm and about 30 atm. In some embodiments involving vacuum, the regeneration pressure is between about 0.1 atm and about 1 atm. The amount of pressure swing in each embodiment differs based upon the adsorbent material used and can be a vacuum swing for certain adsorbent materials. Certain embodiments advantageously are conducted without compression of the permeate byproduct gas stream thereby eliminating significant capital costs and operating costs.

Thus, in certain embodiments, the adsorbent material should have a working capacity designed for a system operating with a pressure of the entering permeate byproduct gas stream of between about 1 atm and about 80 atm, about 1 atm and about 70 atm, about 2 atm and about 60 atm, about 1 atm and about 50 atm, about 30 atm to about 70 atm, about 25 atm to about 40 atm, and about 5 atm and about 40 atm. The working capacity can be designed for swings from an initial plant pressure down to 0.1 atm.

As used herein, working capacity is the difference between the maximum average loading and the minimum average loading of the adsorbate (substance adsorbed) experienced by the adsorbent bed during a pressure swing adsorption cycle. Selectivity is the ability of the adsorbent to bind/adsorb one particular species (adsorbate) over another.

In certain embodiments, the adsorbent can be a composite material and include, for example without limitations, a porous solid support and charged sources associated with the porous solid support. In some embodiments, the porous solid support includes at least one of porous carbon, glass, glass materials made from silicon oxide, metals, metalloids, sulfur, nitrogen, oxides, nitrides, sulfides, and combinations thereof. In some embodiments, the porous adsorbent material has increased pore volumes with pores consisting of micropores with diameters less than or equal to about 2 nm. In some embodiments, the porous adsorbent material has increased pore volume consisting of micropores with diameters less than or equal to about 2 nm and mesoporous pores between greater than about 2 nm and equal to about 3 nm. It will be appreciated by those with skill in the art that pore sizes are distributed and are not uniform. To that end, embodiments that specify a pore size range refer to a majority of the pores. For example, an embodiment where the porous solid support includes micropores in a range at or below 2 nm and mesopores in a range between about greater than 2 nm and equal to about 3 nm means that a majority of the pores are at or below 3 nm.

In some embodiments the pore diameter is stabilized by the presence of heteroatoms. Advantageously, the rate of adsorbate uptake for microporous materials is fast compared to traditional porous carbon materials. Without being bound by any theory or explanation, it is assumed that smaller micropores will kinetically favor adsorbing certain smaller molecules over larger molecules, such as hydrocarbon molecules. In some embodiments, the material has a physical form that allows it to be introduced in a packed bed or supported structure. In certain embodiments, different adsorbents are used in different locations of the bed for improved performance. In some embodiments, the material has a physical form that allows it to be introduced in a packed bed or supported structure.

In some embodiments, the porous solid supports can include pores that can be classified as microporous and mesoporous. In some embodiments, the pores comprise mesoporous pores less than about 50 nanometers (nm) in diameter and microporous pores less than or equal to about 2 nm in diameter. In some embodiments, the pores comprise only mesoporous pores between greater than about 2 nm and about 50 nm. In some embodiments, the pores comprise only microporous pores less than or equal to about 2 nm. In some embodiments, the pores comprise mesoporous pores less than about 10 nm and microporous pores less than about or equal to about 2 nm. In some embodiments, the pores comprise mesoporous pores less than about 5 nm and microporous pores less than or equal to about 2 nm.

As used herein, a hydrogen sulfide polishing unit refers to a unit that reduces the concentration of hydrogen sulfide in the gas streams to levels that meet environmental compliance. Hydrogen sulfide polishing units include but are not limited to hydrogen sulfide scavenger units, membrane-based hydrogen sulfide separation units, and hydrogen sulfide polishing units. In certain embodiments, a hydrogen sulfide polishing unit can involve injection of scavenger(s) directly into the inlet gas stream. Such units can include nozzles, quills, static mixers, bubble towers, scrubber units, or pump pulsation dampeners, or combinations thereof to introduce the scavenger(s) to the hydrogen sulfide in the gas stream. Chemical additives, including but not limited to sodium hydroxide, potassium hydroxide, amine scavengers, peroxides, formaldehydes, nitrites, or combinations thereof, can perform as scavengers and convert the hydrogen sulfide into other sulfur compounds. The scavengers used in the hydrogen sulfide polishing unit can be water-soluble. In certain embodiments, the scavengers used in the hydrogen sulfide polishing unit can be oil-soluble. In certain embodiments, the scavenger can be an adsorbent. In certain embodiments, the adsorbent can be made of nanoparticles. In certain embodiments, $H_2S$ scavenging is carried out without, or in the absence of, regeneration of the $H_2S$ scavengers.

In some embodiments, the positively charged source can include one or more of oxygen-based ionic compounds, sulfur-based ionic compounds, nitrogen-based ionic compounds, metal oxides, metal nitrides, metal sulfides, and combinations thereof. In some embodiments, the nucleophilic source includes a metal oxide, including but not limited to various iron oxides. In certain embodiments, the scavengers used in the hydrogen sulfide polishing unit can be metal-based scavengers, including copper or zinc-containing chemicals and iron oxides. In certain embodiments, a hydrogen sulfide polishing unit that reduces the concentration of hydrogen sulfide in the gas streams can operate in two steps. The first step removes the majority of the hydrogen sulfide, while the second step is a polishing step that further reduces the hydrogen sulfide concentration.

Exemplary embodiments of the present invention include integrated systems and methods of recovery of carbon dioxide and hydrogen sulfide, using a membrane-based separation unit and a pressure swing adsorption unit, in combination with a hydrogen sulfide polishing unit. Utilizing pressure swing adsorption results in energy savings, for example, as PSA units often require less compression than using a second membrane-based separation unit to process the permeate. A second stage membrane-based separation unit usually requires its inlet pressure to be equal or close to the inlet pressure of the first membrane-based separation unit. In certain embodiments, PSA units operate at lower pressure than inlet pressure of the membrane units.

Figure 2:
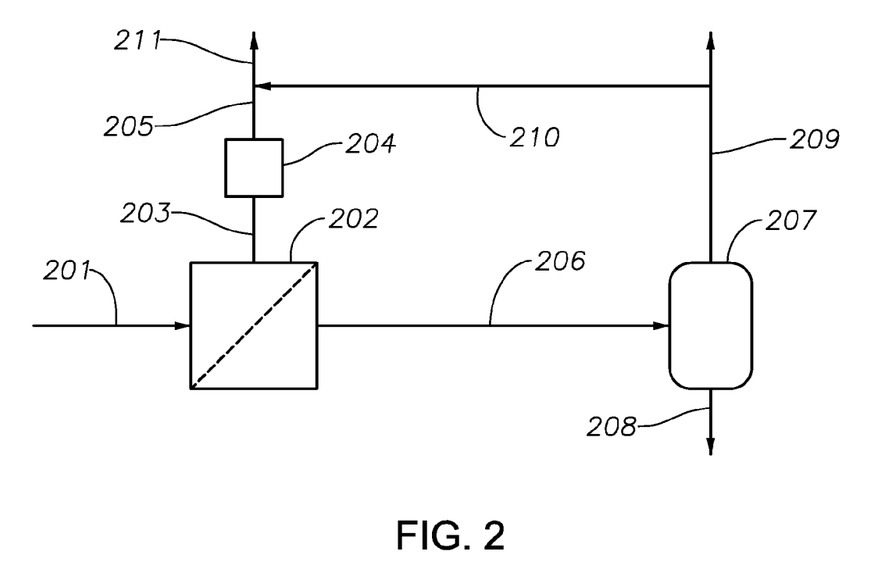
FIG. 2 is a schematic block diagram of an exemplary carbon dioxide treatment unit in combination with a hydrogen sulfide polishing unit according to an embodiment of the present invention.

FIG. 2 illustrates an exemplary method of recovery of carbon dioxide, using a membrane-based separation unit and a pressure swing adsorption unit, in combination with a hydrogen sulfide polishing unit. An inlet gas stream 201 that contains carbon dioxide and hydrogen sulfide is introduced to a membrane-based separation unit 202. The retentate gas stream 203 is supplied to a hydrogen sulfide polishing unit 204. The outlet gas stream 205 exiting the hydrogen sulfide polishing unit 204 has greatly reduced levels of hydrogen sulfide and is supplied as sales gas 211.

The permeate byproduct gas stream 206 from the membrane-based separation unit 202 that is about 10-20% of the inlet gas volume is supplied to a pressure swing adsorption unit 207 to further increase the carbon dioxide content. In certain embodiments, multiple PSA units operating in parallel can increase the carbon dioxide concentration capacity of the integrated system. In certain embodiments, operating multiple PSA units in parallel will enable the system to handle greater than 20% of the inlet gas volume, and in certain embodiments, the system is enabled to handle greater than 30% of inlet gas volume. A substantially purified carbon dioxide stream 208 is produced following the pressure swing adsorption process. Also produced during the pressure swing adsorption process is the residual gas stream 209 that is utilized as either fuel gas or as additional sales gas.

Optionally, the residual gas stream 209 is cycled by stream 210 in combination with the outlet gas stream 205 from the hydrogen sulfide polishing unit 204 as part of the sales gas 211. The pressure swing adsorption unit 207 further increases the carbon dioxide content of the permeate output from the membrane-based separation unit 202 by separating the major portion of the natural gas or hydrocarbons that has diffused through the membrane. Thus, a PSA unit is operable to produce the purified $CO_2$ stream, and a purified hydrocarbon stream that can then be used as fuel or recombined with retentate from the membrane separation unit as additional sales gas. The systems and methods of the present disclosure, including the embodiment of FIG. 2, can be carried out without, or in the absence of, recycling the methane and/or $CO_2$ product streams.

Figure 3:
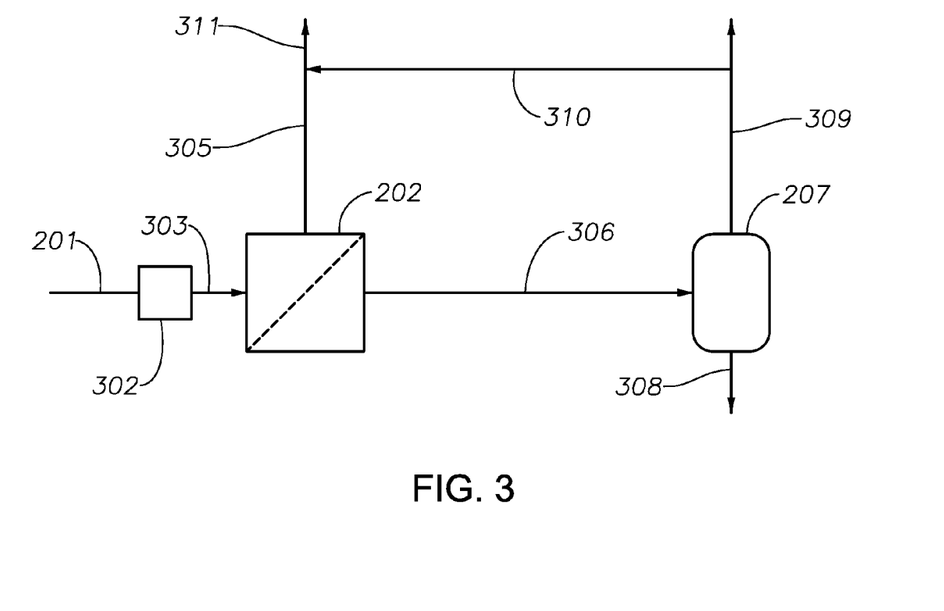
FIG. 3 is a schematic block diagram of another exemplary carbon dioxide treatment unit in combination with a hydrogen sulfide polishing unit according to an embodiment of the present invention.

FIG. 3 illustrates another exemplary method for an integrated unit involving a membrane-based separation unit, a hydrogen sulfide polishing unit, and a pressure swing adsorption unit. The inlet gas stream 201 that contains carbon dioxide and hydrogen sulfide is introduced to a hydrogen sulfide polishing unit 302. The outlet gas stream 303 exiting the hydrogen sulfide polishing unit 302 has greatly reduced levels of hydrogen sulfide and is subsequently introduced to the membrane-based separation unit 202. The retentate gas stream 305 has reduced levels of carbon dioxide and is supplied as sales gas 311. The permeate byproduct gas stream 306 from the membrane-based separation unit 202 that is about 10-20% of the inlet gas volume is supplied to the pressure swing adsorption unit 207 to further increase the carbon dioxide content. A substantially purified carbon dioxide stream 308 is produced. Also produced during the pressure swing adsorption process is the residual gas stream 309 that is utilized as either fuel gas or as additional sales gas. Optionally the residual gas stream 309 is cycled 310 in combination with the retentate gas stream 305 from the membrane-based separation unit 202 as part of the sales gas 311.

Exemplary embodiments of the present invention include systems and methods of enhanced carbon dioxide recovery from an integrated unit involving a membrane-based separation unit and a pressure swing adsorption unit. Exemplary embodiments of the present invention include systems and methods of enhanced carbon dioxide and hydrogen sulfide recovery from an integrated unit involving a membrane-based separation unit and a pressure swing adsorption unit. In certain embodiments, a pressure swing adsorption unit can also operate as a hydrogen sulfide polishing unit.

Figure 4:
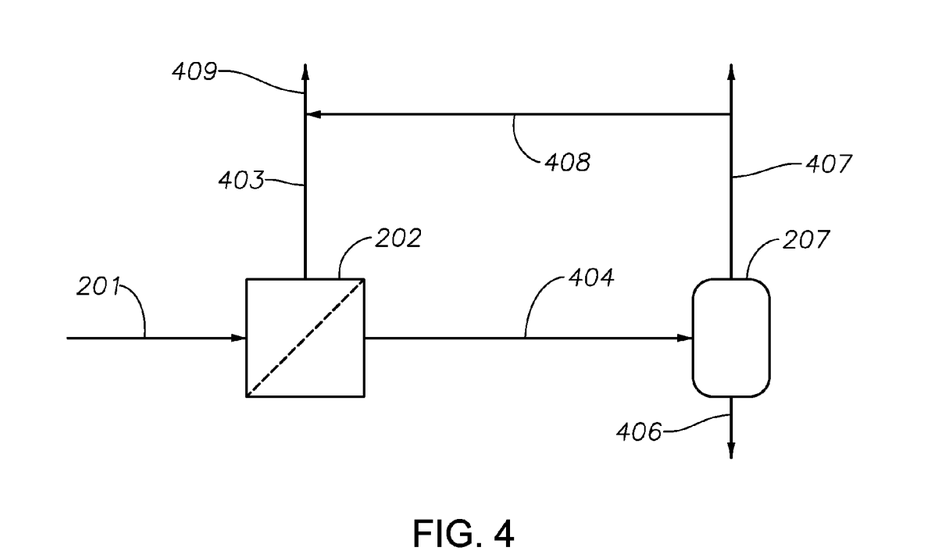
FIG. 4 is a schematic block diagram of an exemplary carbon dioxide treatment unit according to an embodiment of the present invention.

FIG. 4 illustrates an exemplary method for an integrated unit involving a membrane-based separation unit and a pressure swing adsorption unit. The inlet gas stream 201 is introduced to the membrane-based separation unit 202. The retentate gas stream 403 is supplied as sales gas 409. The permeate byproduct gas stream 404 from the membrane-based separation unit 202 is supplied to the pressure swing adsorption unit 207. A substantially purified carbon dioxide stream 406 is produced. Also produced during the PSA process is the residual gas stream 407 that is utilized as either fuel gas or as additional sales gas. Optionally the residual gas stream 407 is combined by stream 408 with the retentate gas stream 403 from the membrane-based separation unit 202 and supplied as part of the sales gas 409.

Exemplary embodiments of the present invention include systems and methods of hydrogen sulfide recovery involving a membrane-based separation unit and a hydrogen sulfide polishing unit. Exemplary embodiments of the present invention include systems and methods of enhanced carbon dioxide recovery using one or more membrane-based separation units and one or more pressure swing adsorption units, in combination with one or more hydrogen sulfide polishing units.

Figure 5:
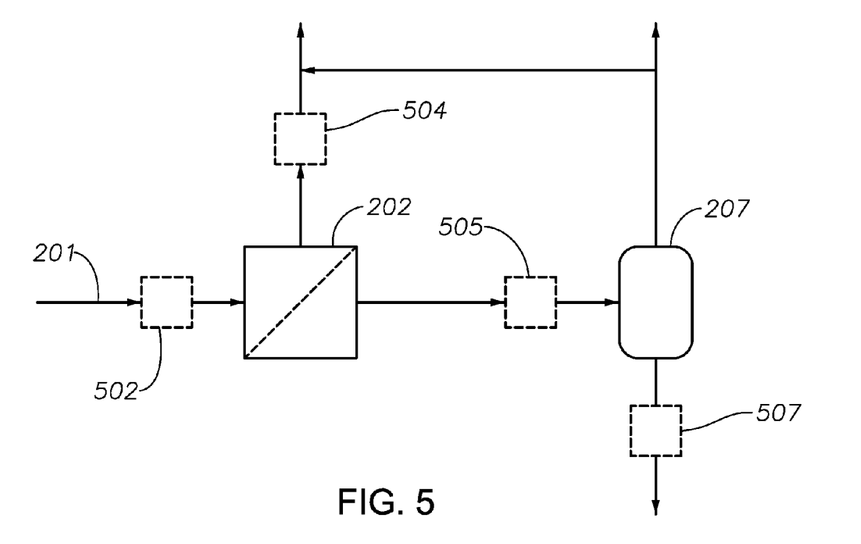
FIG. 5 is a schematic block diagram of another exemplary carbon dioxide treatment unit in combination with hydrogen sulfide polishing units according to an embodiment of the present invention.

FIG. 5 is a schematic representation of possible locations of hydrogen sulfide polishing units in an integrated system. As discussed herein, inlet gas stream 201 can be processed first by hydrogen sulfide polishing unit 502. In certain embodiments, hydrogen sulfide polishing unit 504 can be operated to process the retentate from the membrane-based separation unit 202. In certain embodiments, hydrogen sulfide polishing unit 505 can be utilized to remove hydrogen sulfide in the permeate stream rich in carbon dioxide from membrane-based separation unit 202, before subsequent processing by the pressure swing adsorption unit 207. In certain embodiments, hydrogen sulfide polishing unit 507 can be utilized to remove hydrogen sulfide in the heavy stream from the pressure swing adsorption unit 207 to produce the purified $CO_2$ stream. In certain embodiments of the invention, more than one hydrogen sulfide polishing unit can be positioned in any combination of the locations described herein.

Exemplary embodiments of the present invention also include systems and methods of carbon dioxide and hydrogen sulfide recovery involving a membrane-based separation unit and an adsorption based separation unit(s). Exemplary embodiments of the present invention include systems and methods of enhanced carbon dioxide recovery using one or more membrane-based separation units and one or more pressure swing adsorption units, in combination with one or more hydrogen sulfide polishing units.

FIG. 6 is a schematic representation of possible locations of hydrogen sulfide units in an integrated system. As discussed herein, inlet gas stream 201 can be processed first by a hydrogen sulfide polishing unit 602. In certain embodiments, hydrogen sulfide polishing unit 604 can be operated to process the retentate from the membrane-based separation unit 202. In certain embodiments, pressure swing adsorption unit(s) 207 can be utilized to remove hydrogen sulfide and carbon dioxide from the permeate stream of membrane-based separation unit 202, before subsequent processing by a second pressure swing adsorption unit 606. Second pressure swing adsorption unit 606 is used to separate the heavy stream from the pressure swing adsorption unit 207 to produce a purified $CO_2$ stream 607 and a purified $H_2S$ stream 608 based on the unique adsorption-desorption characteristics of these gas components to adsorbents in second pressure swing adsorption unit 606. In certain embodiments of the invention, more than one pressure swing adsorption unit can be positioned in any combination of the locations described herein.

As illustrated in FIG. 6, and as will be understood by those skilled in the art, one or more membrane-based separation units 202 are positioned to receive inlet gas stream 201 containing one or more of carbon dioxide and hydrogen sulfide and to operably process the inlet gas thereby to produce respective and separate retentate outputs and permeate outputs therefrom. The system also can include one or more hydrogen sulfide polishing units 602 positioned to process the inlet gas stream 201 from the prior to supply to the one or more membrane-based separation units and one or more hydrogen sulfide polishing units 604 operably positioned to process the retentate outputs from the one or more membrane-based separation units. Additionally, the system can include the pressure swing adsorption unit 207 operably positioned to remove hydrogen sulfide and carbon dioxide from the permeate outputs of the one or more membrane-based separation units 202 prior to subsequent processing and a second pressure swing adsorption unit 606 in fluid communication with the first pressure swing adsorption unit operably positioned to receive and separate heavy stream outputs from the first pressure swing adsorption unit to produce purified $CO_2$ stream 607 and purified $H_2S$ stream 608 as outputs therefrom responsive to preselected adsorption-desorption characteristics of these gas components to adsorbents.

Exemplary embodiments of the present invention further include systems and methods of carbon dioxide and hydrogen sulfide recovery involving a membrane-based separation unit and an adsorption based separation unit(s). Exemplary embodiments of the present invention include systems and methods of enhanced carbon dioxide recovery using one or more membrane-based separation units and one or more pressure swing adsorption units, in combination with one or more hydrogen sulfide polishing units. FIG. 7 is a schematic representation of possible locations of hydrogen sulfide polishing units in an integrated system. FIG. 7, for example, illustrates a carbon dioxide treatment unit in combination with hydrogen sulfide polishing units and where the acid gases are further separated by synchronized and coupled trains into purified carbon dioxide and hydrogen sulfide according to an embodiment of the present invention. As illustrated, inlet gas stream 201 can be processed first by a hydrogen sulfide polishing unit 702.

In certain embodiments, hydrogen sulfide polishing unit 704 can be operated to process the retentate from the membrane-based separation unit 202. In certain embodiments, through the utilization of multiple pressure swing adsorption trains, 705, hydrogen sulfide and carbon dioxide can be separately purified from the permeate byproduct gas stream of membrane-based separation unit 202. The coupled pressure swing adsorption trains are operated in a scheduled and synchronized manner, with each train comprising one or more individual beds. Pressure swing adsorption trains can produce a purified hydrocarbon stream 706 to be combined with sales gas, while also producing highly purified $CO_2$ stream 707, and highly purified $H_2S$ stream 708, based on the unique adsorption-desorption characteristics of these gas components to adsorbents in 705. In certain embodiments of the invention, a mixed stream or streams, can also be produced from the coordinated pressure swing trains to subsequently produce a gas mixture 709 that could be used for fuel or for other purposes.

As illustrated in FIG. 7, the first and second pressure swing adsorption units, operably can be positioned to form two or more pressure swing adsorption trains (Train I and Train II respectively) to separately purify hydrogen sulfide and carbon dioxide from the permeate outputs of the one or more membrane-based separation units. The two or more pressure swing adsorption trains can be operable in scheduled and synchronized manners to enhance performance characteristics as will be understood by those skilled in the art. Each of the two or more pressure swing adsorption trains includes one or more individual beds, and the two or more pressure swing absorption trains can produce a purified hydrocarbon stream to operably combine with sales gas and produce a highly purified carbon dioxide stream 707 as an output and a highly purified hydrogen sulfide stream 708 as an output responsive to preselected adsorption-desorption characteristics of these gas components to adsorbents. The two or more pressure swing absorption trains also can produce an output of a gas mixture 709 for fuel or other purposes, as will be understood by those skilled in the art.

EXAMPLES

Simulated examples are presented to illustrate the utility of combining the two disparate techniques (PSA and membrane separation) to achieve enhanced purity and recovery. If processing 100 million standard cubic feet of natural gas per day (MMscfd) with about 13 mol % initial $CO_2$ contamination were required, and only a simple, single-membrane system were used, purified $CH_4$ product is produced, but much of the $CH_4$ also slips into the permeate byproduct gas, or "waste," stream. And even in a two-stage membrane system with recycle, a better purified product is produced, but a secondary $CO_2$ product is of low purity, with significant higher-value product still slipping into the $CO_2$ product stream. This is also an energy intensive endeavor, because significant compression is required to pressurize the permeate stream in preparation for the inlet to the second membrane unit.

Figure 8A:
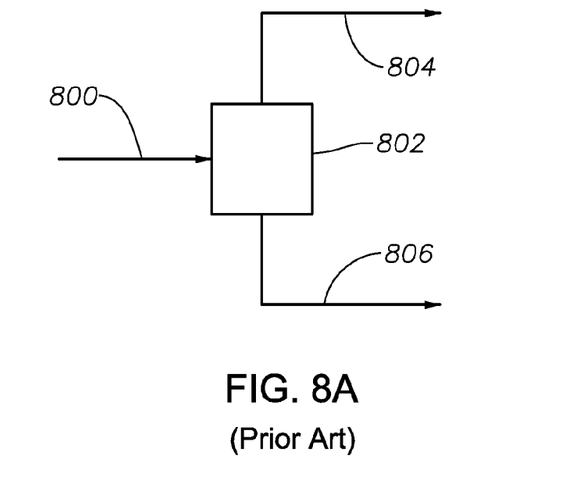
FIGS. 8A and 8B are prior art schematic block diagrams of systems with reduced efficiency component separations.

Referring now to FIG. 8A and Table 1 below, Table 1 shows the values obtained in a simulated single-pass membrane system with a feed of 100 MMscfd by volume comprising 86% methane (mole fraction) and 13% $CO_2$ (mole fraction). Feed stream 800 flows to membrane 802 and passes in a single pass, which separates feed stream 800 into a retentate stream 804 and a permeate byproduct gas stream 806. As can be seen in Table 1, while a 97% pure gas product is produced as the retentate, a large percentage of natural gas is left mixed with the permeate byproduct gas stream, and thus further separation would be needed to produce acceptable recovery of hydrocarbons and prevent waste.

TABLE 1

Example separation for a one-stage membrane system.

| One-stage membrane | Feed stream (800) | Permeate byproduct gas stream (806) | Retentate stream (804) |
|---|---|---|---|
| Gas Flow (MMscfd) | 100 | 25 | 75 |
| Pressure (psia) | 1,000 | 50 | 960 |
| Mole Fraction $CO_2$ (%) | 13 | 46 | 2 |
| Mole Fraction $CH_4$ (%) | 86 | 53 | 97 |

Figure 8B:
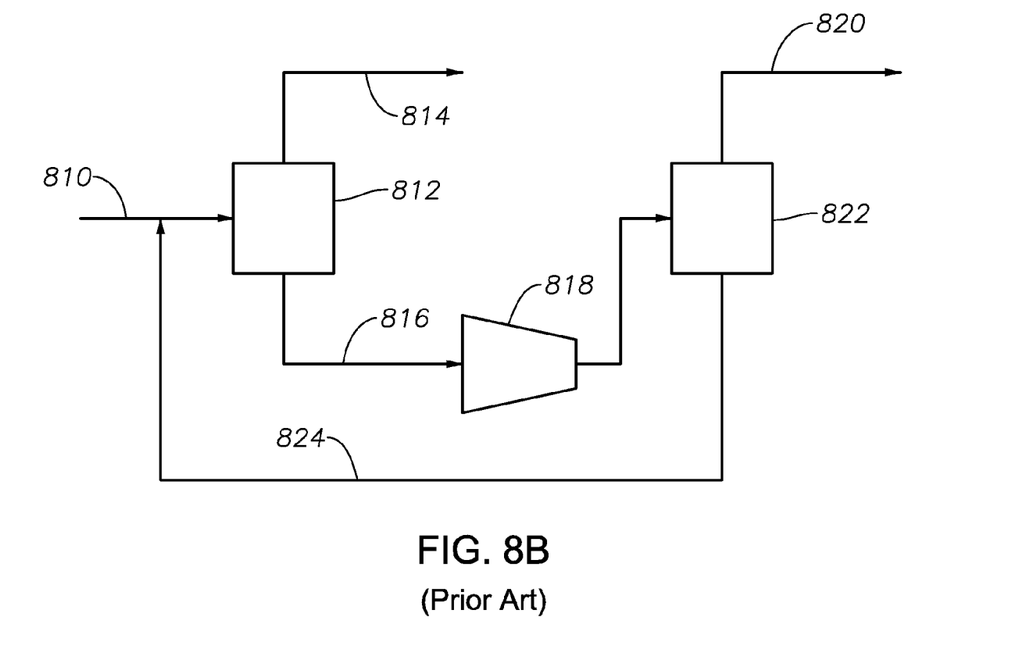

Now referring to FIG. 8B and Table 2 below, simulated example results are shown for a two-stage membrane system with recycle. A feed stream 810 flows to membrane 812, and membrane 812 separates feed stream 810 into a retentate stream 814 and a permeate byproduct gas stream 816. A compressor 818 compresses permeate byproduct gas stream 816 to increase the pressure of the stream, and the stream flows to a second membrane 822, which separates the stream into a $CO_2$ product stream 820 and a recycle stream 824.

Even in a two-stage membrane system with recycle, a better purified $CO_2$ product is produced, but a secondary $CO_2$ product is of low purity, with a significant amount of higher-value methane product still slipping into the purified $CO_2$ product stream. This is also an energy intensive endeavor, because significant compression is required to pressurize the permeate byproduct gas stream in preparation for the inlet to the second membrane unit. Equipment costs for compression are also significant.

TABLE 2

Example separation for a two-stage membrane separation system.

| Two-stage membrane | Feed stream (810) | Feed + Recycle | Permeate byproduct gas stream (816) | Retentate stream (814) | $CO_2$ product steam (820) | Recycle stream (824) |
|---|---|---|---|---|---|---|
| Gas Flow (MMscfd) | 100 | 115 | 28 | 87 | 13 | 15 |

TABLE 2-continued

Example separation for a two-stage membrane separation system.

| Two-stage membrane | Feed stream (810) | Feed + Recycle | Permeate byproduct gas stream (816) | Retentate stream (814) | $CO_2$ product steam (820) | Recycle stream (824) |
|---|---|---|---|---|---|---|
| Pressure (psia) | 1,000 | 1,000 | 50 | 960 | 25 | 990 |
| Mole Fraction $CO_2$ (%) | 13 | 13 | 47 | 2 | 86 | 13.5 |
| Mole Fraction $CH_4$ (%) | 86 | 86 | 52 | 97 | 13 | 86 |

Figure 9:
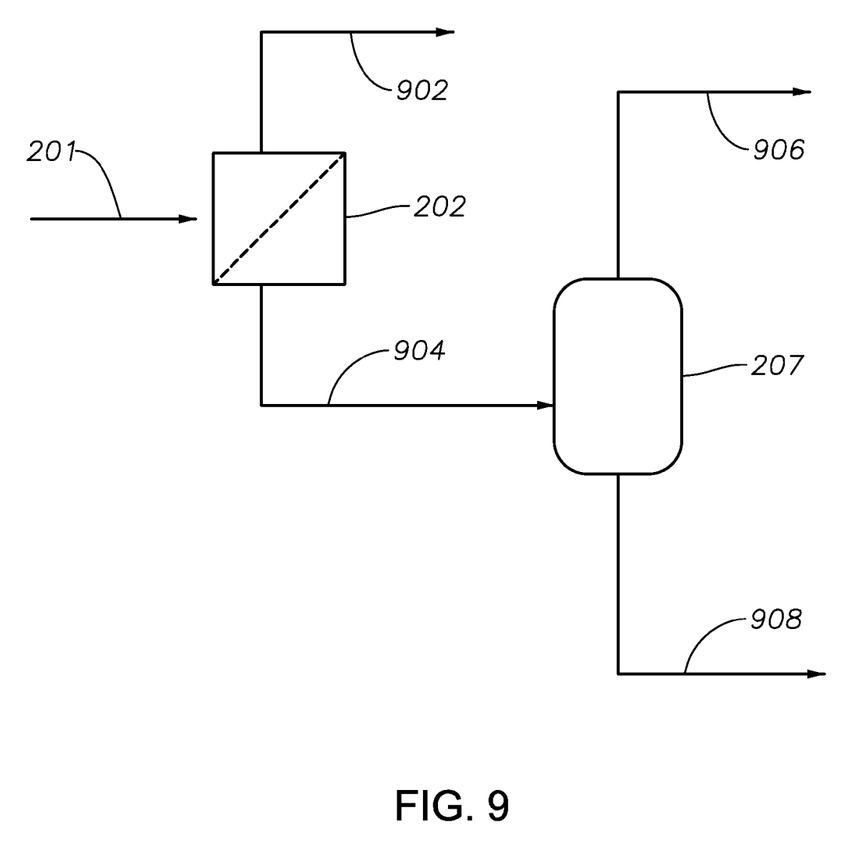
FIG. 9 is a schematic block diagram of a system with increased efficiency component separation.

Referring now to FIG. 9 and Table 3 below, a simulated system including a membrane followed by PSA to process natural gas that is in the permeate byproduct gas stream allows the separation and recovery of three high purity products, while minimizing energy intensive compression and reducing product loss typical of membrane only systems. The membrane and PSA system enhances $CO_2$ purity thereby enhancing methane recovery advantageously by minimizing compression required for a traditional second stage of product recovery.

Inlet gas stream 201 flows to membrane-based separation unit 202, and in a single pass inlet gas stream 201 is separated into a retentate stream 902 and a permeate byproduct gas stream 904. Permeate byproduct gas stream 904 flows to pressure swing adsorption unit 207 for separation into light product stream 906 and heavy product stream 908.

TABLE 3

Example separation for a combination membrane-PSA separation system.

| Membrane + PSA | Inlet gas stream (201) | Permeate byproduct gas stream (904) | Retentate stream (902) | Heavy product stream (908) | Light product stream (906) |
|---|---|---|---|---|---|
| Gas Flow (MMscfd) | 100 | 25 | 75 | 11 | 13 |
| Pressure (psia) | 1,000 | 50 | 960 | 13 | 48 |
| Mole Fraction $CO_2$ (%) | 13 | 46 | 2 | 96 | 0.5 |
| Mole Fraction $CH_4$ (%) | 86 | 53 | 97 | 0.5 | 98 |

In addition to methane and carbon dioxide, hydrogen sulfide is naturally occurring in many oil and gas production streams. It also is present in exiting fluid streams of several industrial processes, including but not limited to, gas emissions from hydrocarbon processing plants, and other oil, gas, and chemical production plants. Hydrogen sulfide also can be present as a contaminant in finished products of hydrocarbon processing plants, and other oil, gas, and chemical production plants. This contaminant gas is very poisonous, corrosive, and explosive and also needs to be separated and treated, if found in a gas stream. Exemplary systems herein also address hydrogen sulfide separation.

Embodiments include many additional standard components or equipment that enables and makes operable the described apparatus, process, method and unit. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices. Operation, control and performance of portions of or entire steps of a process or method can occur through human interaction, pre-programmed computer control and response units, or combinations thereof.

Moreover, the foregoing has broadly outlined certain objectives, features, and technical advantages of the present invention and a detailed description of the invention so that embodiments of the invention may be better understood in light of features and advantages of the invention as described herein, which form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages are better understood from the description above when considered in connection with the accompanying figures. It is to be expressly understood, however, that such description and figures are provided for the purpose of illustration and description only and are not intended as a definition of the limits of the present invention. It will be apparent to those skilled in the art that various modifications and changes can be made within the spirit and scope of the invention as described in the foregoing specification.

What is claimed is:

1. A method of enhanced carbon dioxide recovery from an inlet gas stream, the method comprising the steps of:

introducing an inlet gas stream, having carbon dioxide and hydrogen sulfide, to one or more hydrogen sulfide polishing units;

operating the one or more hydrogen sulfide polishing units to produce an outlet gas stream with a reduced concentration of hydrogen sulfide compared to the inlet gas stream;

introducing the outlet gas stream to one or more membrane-based separation units;

operating the one or more membrane-based separation units to produce a permeate byproduct gas stream having increased concentration of carbon dioxide compared to the carbon dioxide concentration in the outlet gas stream;

directly introducing the permeate byproduct gas stream to one or more pressure swing adsorption units without compression; and operating the one or more pressure swing adsorption units to produce a substantially pure carbon dioxide stream comprising substantially all of the carbon dioxide from the permeate byproduct gas stream in a single pass.

2. The method of claim 1, further comprising the steps of:

operating the one or more membrane-based separation unit to produce a retentate gas stream having hydrogen sulfide;

introducing the retentate gas stream to one or more post-membrane hydrogen sulfide polishing units; and operating the one or more post-membrane hydrogen sulfide polishing units to produce a reduced hydrogen sulfide outlet gas stream with a reduced concentration of hydrogen sulfide compared to the retentate gas stream.

3. The method according to claim 2, wherein the permeate byproduct gas stream comprises less than 70% by molar basis carbon dioxide.

4. The method according to claim 2, wherein the permeate byproduct gas stream comprises less than 50% by molar basis carbon dioxide.

5. An enhanced carbon dioxide recovery system, the system comprising:

one or more hydrogen sulfide polishing units that is operable to receive an inlet gas stream having carbon dioxide and hydrogen sulfide and to produce an outlet gas stream with a reduced concentration of hydrogen sulfide compared to the inlet gas stream;

one or more membrane-based separation units that fluidly couples to the one or more hydrogen sulfide polishing units and that is operable to receive the outlet gas stream and to produce a permeate byproduct gas stream having increased concentration of carbon dioxide compared to the carbon dioxide concentration in the outlet gas stream; and one or more pressure swing adsorption units that fluidly couples directly to the one or more membrane-based separation units without compression and that is operable to receive the permeate byproduct gas stream and to produce a substantially pure carbon dioxide stream comprising substantially all of the carbon dioxide from the permeate byproduct gas stream in a single pass.

6. The enhanced carbon dioxide recovery system of claim 5, wherein the one or more membrane-based separation units further is operable to produce a retentate gas stream having hydrogen sulfide.

7. The system according to claim 5, wherein the permeate byproduct gas stream comprises less than 70% by molar basis carbon dioxide.

8. The system according to claim 5, wherein the permeate byproduct gas stream comprises less than 50% by molar basis carbon dioxide.

9. An enhanced carbon dioxide and hydrogen sulfide recovery system, the system comprising:

one or more membrane-based separation units positioned to receive an inlet gas containing one or more of carbon dioxide and hydrogen sulfide and operably process the inlet gas thereby to produce respective and separate retentate outputs and permeate outputs therefrom;

one or more hydrogen sulfide polishing units positioned to process the inlet gas prior to supply to the one or more membrane-based separation units;

one or more hydrogen sulfide polishing units operably positioned to process the retentate outputs from the one or more membrane-based separation units;

a first pressure swing adsorption unit coupled directly to the one or more membrane-based separation units without compression to remove hydrogen sulfide and carbon dioxide from the permeate outputs of the one or more membrane-based separation units prior to subsequent processing; and a second pressure swing adsorption unit in fluid communication with the first pressure swing adsorption unit operably positioned to receive and separate heavy stream outputs from the first pressure swing adsorption unit to produce a purified $CO_2$ stream, comprising substantially all of the $CO_2$ from the heavy stream outputs, and purified $H_2S$ as outputs therefrom responsive to preselected adsorption-desorption characteristics of these gas components to adsorbents.

10. An enhanced carbon dioxide recovery system as defined in claim 9, wherein the first and second pressure swing adsorption units comprise two or more pressure swing adsorption trains to separately purify hydrogen sulfide and carbon dioxide from the permeate outputs of the one or more membrane-based separation units, the two or more pressure swing adsorption trains being operable in scheduled and synchronized manners.

11. A system as defined in claim 10, wherein each of the two or more pressure swing adsorption trains includes one or more individual beds.

12. A system as defined in claim 10, wherein the two or more pressure swing adsorption trains produce a purified hydrocarbon stream to operably combine with sales gas and produce a highly purified carbon dioxide stream and a highly purified hydrogen sulfide stream responsive to preselected adsorption-desorption characteristics of these gas components to adsorbents.

13. A system as defined in claim 10, wherein the two or more pressure swing absorption trains further produce an output of a gas mixture for fuel or other purposes.

14. The system according to claim 10, wherein the permeate output comprises less than 70% by molar basis carbon dioxide.

15. The system according to claim 10, wherein the permeate output comprises less than 50% by molar basis carbon dioxide.

16. The method according to claim 1, wherein the substantially pure carbon dioxide stream is at least 90% pure carbon dioxide by molar basis.

17. The system according to claim 5, wherein the substantially pure carbon dioxide stream is at least 90% pure carbon dioxide by molar basis.

18. The system according to claim 9, wherein the purified $CO_2$ stream is at least 90% pure carbon dioxide by molar basis.

19. The method according to claim 1, wherein the substantially pure carbon dioxide stream is at least 96% pure carbon dioxide by molar basis.

20. The system according to claim 5, wherein the substantially pure carbon dioxide stream is at least 96% pure carbon dioxide by molar basis.

21. The system according to claim 9, wherein the purified $CO_2$ stream is at least 96% pure carbon dioxide by molar basis.

* * * * *